United States Patent [19]

Sparks

[11] 3,961,005

[45] June 1, 1976

[54] SPHERICAL AGGLOMERATION OF ILMENITE

[75] Inventor: Bryan D. Sparks, Ottawa, Canada

[73] Assignee: Canadian Patents and Development Limited, Ottawa, Canada

[22] Filed: Aug. 28, 1972

[21] Appl. No.: 284,384

[30] Foreign Application Priority Data

Sept. 1, 1971 Canada ............................... 121904

[52] U.S. Cl. .................................................. 264/117
[51] Int. Cl.² ............................................. B01J 2/28
[58] Field of Search ...................................... 264/117

[56] References Cited

UNITED STATES PATENTS

| | | | |
|---|---|---|---|
| 3,449,483 | 6/1969 | Quist | 264/117 |
| 3,617,228 | 11/1971 | Smit | 264/117 |
| 3,755,244 | 8/1973 | Hart | 264/117 |

*Primary Examiner*—Robert F. White
*Assistant Examiner*—J. R. Hall
*Attorney, Agent, or Firm*—W. John McClenahan

[57] ABSTRACT

A process for upgrading an ilmenite concentrate by agglomerating the ilmenite fraction and removing gangue materials such as complex silicates in an aqueous phase. An aqueous dispersion of the concentrate suitably ground to about 60% minus 400 mesh is formed, the pH is adjusted in the range of 4 – 5.5, 5–10 lbs./ton of a conditioner such as oleic acid is added, followed by 100–200 lbs./ton of a binder liquid such as a light petroleum oil, and the mixture agitated to cause ilmenite solids in the mixture to absorb the oil thus forming spherical oil-bonded agglomerates containing the ilmenite values. The silicate gangue is removed in aqueous tailings and the agglomerated product separated and further treated to recover pigment grade titanium dioxide.

13 Claims, 6 Drawing Figures

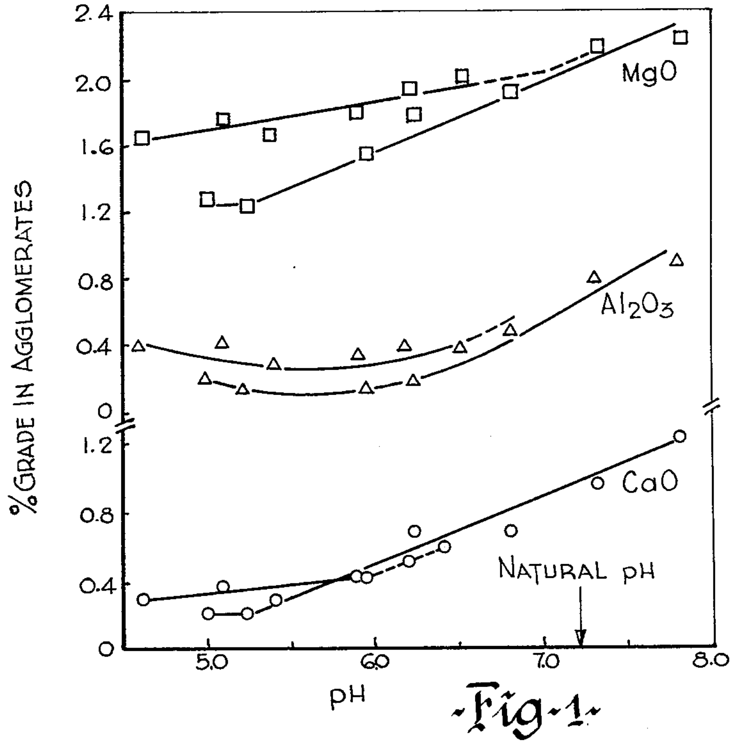
-Fig-1-
-Fig-2-
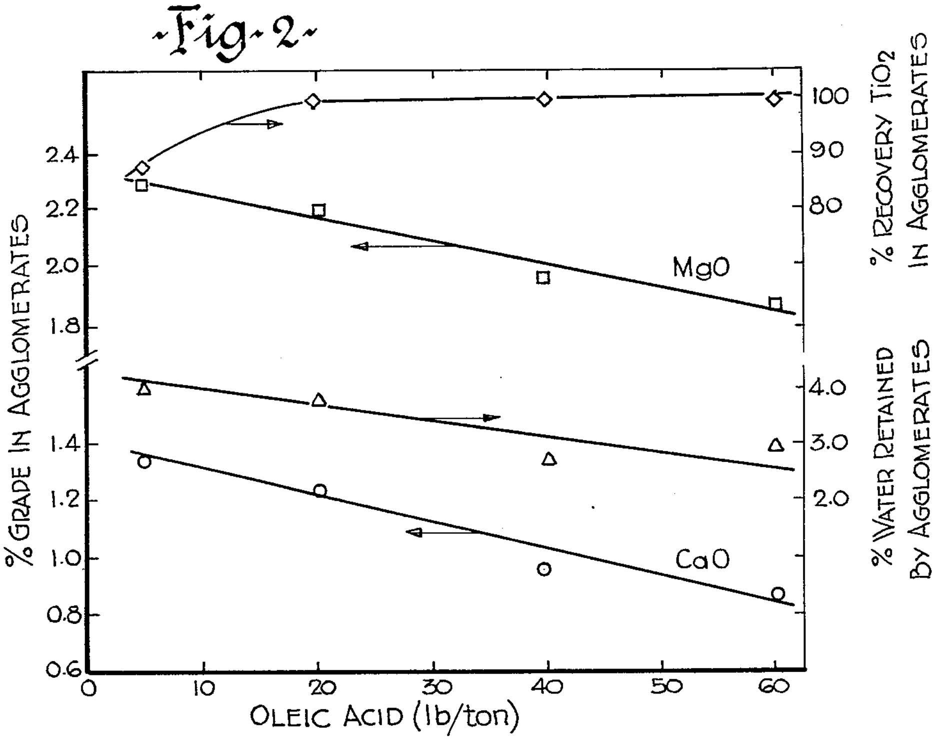

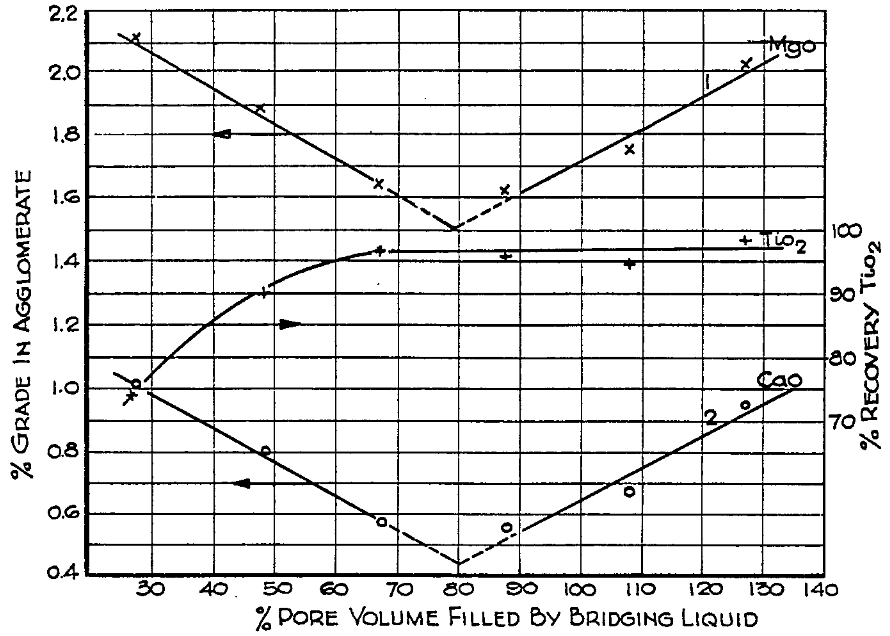
-Fig-5-
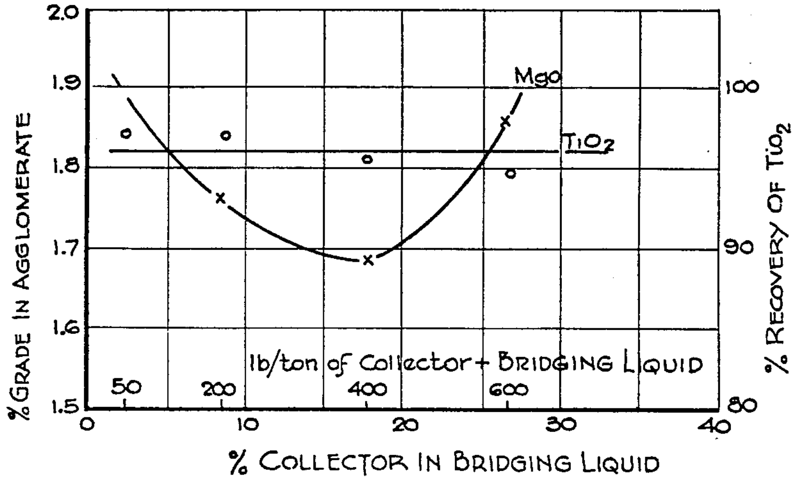
-Fig-6-

SPHERICAL AGGLOMERATION OF ILMENITE

This invention relates to the recovery of high grade ilmenite from ilmenite concentrates containing silicate gangue materials, and more particularly to the agglomeration and recovery of ilmenite in a form suitable for direct production of pigment grade titanium dioxide.

In the preliminary upgrading of ilmenite ores, magnesium, calcium and aluminum silicates are concentrated with the ilmenite fraction and the presence of these impurities is deleterious to the separation of a high grade titanium dioxide product from the ilmenite concentrate. High grade titanium dioxide is used in large quantities as a pigment of extreme whiteness and opacity in paint manufacture. While standard, and well known, flotation procedures may be employed to reduce the MgO, CaO and $Al_2O_3$ concentration to the required 1–2%, the procedure is expensive and the recovery of ilmenite is relatively low. Also, because of the necessity of fine grinding, to the order of –400 Tyler mesh, to liberate the gangue materials, the ilmenite product is also finely divided and not suitable for the further treatment steps which are normally conducted in a fluidised bed.

The aim of the present invention is, therefore, to provide a method for separating ilmenite from silicate gangue materials in concentrates containing the same, by agglomeration and recovery of ilmenite in a form suitable for further processing by conventional techniques.

It has, heretofore, been demonstrated that selective agglomeration occurs when a particular constituent in a mixture of solids ground to a sufficient fineness to achieve liberation of individual mineral constituents and suspended in a liquid phase, is preferentially wetted by a second liquid phase, variously called the binder liquid, oil, or bridging liquid, and the system agitated. The enclosed or wetted particles combine to form agglomerates which can be easily separated from the other solids which are left suspended in or are wetted by the original suspension or carrier liquid, usually water. While this general principle is applicable to the present invention, it has been found that these normal agglomeration procedures are not adequate for the economic recovery of ilmenite of the required grade.

The present invention, therefore, includes the steps of forming an aqueous slurry of particulate solids containing ilmenite and silicate gangue materials, adjusting the pH to between about 4 and about 5.5 and preferably 4.5 –5.0, adding to the mixture a conditioner or collector followed by a bridging or binder liquid such as a light petroleum oil in the proportion of about 5%–10% by weight of solids (or 100–200 lbs./ton), agitating the mixture and oil to cause the promoted solids, namely the ilmenite, to become coated by the oil, continuing the physical agitation to form spherical agglomerates, separating the oil-bonded agglomerates from the aqueous phase containing most of the gangue materials, and subsequently recovering the ilmenite from the agglomerates.

In a preferred embodiment oleic acid in an amount of about 5–20 lbs./ton of solids is employed as the collector, and agitation is effected at a pulp density of about 20–25% solids.

In a still more preferred embodiment, sodium silicate in an amount between 0.1 and 0.5 lb./ton is also added to the suspension as a depressant for the silicate materials. Care in control of sodium silicate is required as above the levels indicated sodium silicate also acts as a depressant for ilmenite.

In one further treatment of the agglomerated ilmenite phase, the agglomerates are washed in fresh water, and roasted to convert the ilmenite to ferric oxide and titanium dioxide. The dispersion of oil throughout the agglomerates is believed to materially assist the roasting step. After roasting, the agglomerates are extremely strong and resistant to attrition and this property permits a further upgrading step. In the separation of the aqueous gangue or tailings phase from the agglomerate phase, particles of partially conditioned gangue become loosely attached to the surface of the agglomerates and are not readily washed off. After roasting, however, the agglomerates are strong and able to withstand a dry screening operation to remove this surface contamination.

It has been further found that, in certain cases, removal of aluminum silicates from the agglomerates may be promoted by carrying out the agglomeration in two stages at different pH values. In the first agglomeration stage the conditioned solids are agglomerated at about pH 5 to 6 to eliminate the maximum amount of high aluminum silicate and the cleaned agglomerates are then ashed at a lower pH, of the order of 4.0 to 5.0 to remove more calcium and magnesium silicates.

The invention will be described with reference to the accompanying drawings, in which FIG. 1 is a graphic chart showing the effect of pH in the treatment system on the gangue material retained in the agglomerate.

FIG. 2 is a graphic chart showing the effect of oleic acid as a promotor for ilmenite.

FIG. 5 is a graphic chart showing effect of void occupation by bridging liquid on gangue retention when ore is conditioned with 20 lbs./ton of collector and FIG. 6 is a graphic chart showing the effect of bridging liquid composition when voids are 100% filled.

Figure 3:
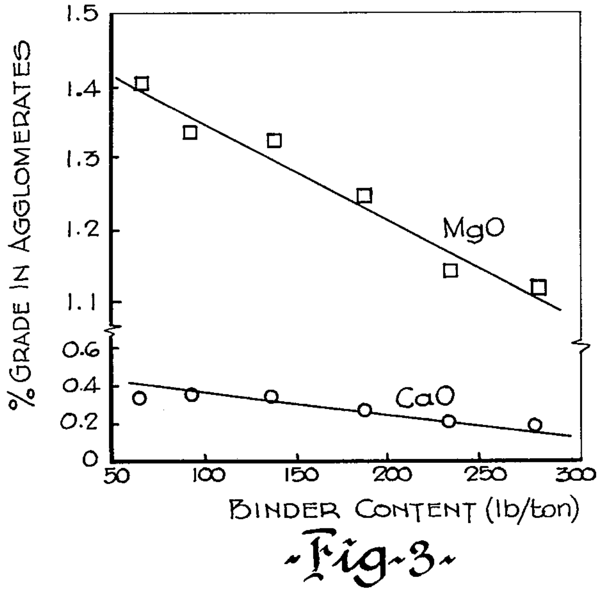
FIG. 3 is a graphic chart showing the effect of increasing the light oil binder liquid in the agglomeration process.

In accordance with the invention a 35 × 100 mesh ilmenite concentrate which, typically, has an analysis as shown in Table I below is ground to achieve substantially complete liberation of the individuals minerals. With some ores it has been found that some of the Mg is present in the ilmenite lattice by solid-solution-substitution of iron, and thus Mg will not be liberated by grinding.

Table I

| | |
|---|---|
| Analysis of Concentrate | |
| $TiO_2$ | — 31.6% |
| $Fe_2O_3$ | — 57.2% |
| $SiO_2$ | — 6.9% |
| MgO | — 2.61% |
| CaO | — 1.94% |
| $Al_2O_3$ | — 1.61% |
| Titaniferous augite: | $Ca(Mg,Fe,Ti,Al)_2[(Si,Al)_2O_6]$ |
| Biotite: | $K(Mg,Fe)_3(AlSi_3O_{10})(OH)_2$ |
| Chlorite: | $(Mg,Fe,Al)_6(Al,Si)_4O_{10}(OH)_8$ |

It has been found that too small a particle size is detrimental to separation by the invention due to the production of slimes and excessive reagent consumption. Normally 20–40% minus 400 mesh Tyler has been found to give satisfactory separations and therefore it is uneconomic to grind more finely. The material should preferably all be minus 270 mesh.

After grinding the concentrate and forming an aqueous dispersion thereof, having a pulp density in a range up to about 40% solids and preferably in the range 20–25%, the pulp is conditioned by the addition of a mineral acid, preferably sulphuric acid, to adjust the pH to between about 4.5 and 5.0. Spherical agglomeration could not be achieved below about pH 4. As can be seen from FIG. 1, pH control of the dispersion increases the selectivity of the subsequent agglomeration and the range of 4.5–5.0 has a depressant effect upon the magnesium and calcium silicates present while permitting agglomeration. The effect on aluminum silicate is similar but the most effective pH is of the order of 5–5.5, i.e., rather higher than for magnesium and calcium. In some instances it may even be desirable to conduct the agglomeration in two stages, the first at pH 5–6 to remove as much aluminum as possible and then a second washing step at pH 4–5 to remove even more of the magnesium and calcium. However, aluminum oxide is not normally a serious contaminant in titania pigment and it may, therefore, be unnecessary or uneconomic to carry out a two stage agglomeration.

The agglomeration process of the present invention is similar to flotation in that it has been found necessary to condition the minerals with a collector or promoter and, optionally, a depressant. The conditioner must render the selected mineral completely hydrophobic and a relatively thick coat of conditioner is required. The conditioner is selected from hydrophobic organic materials containing a polar group which are selectively adsorbed by ilmenite and preferably comprises liquid fatty acids and especially oleic acid although alternative polar organic promoters include a petroleum sulphonate promoter sold under the Trademark "AERO PROMOTER 825" by American Cyanamid Company. Tall oil may also be used as a fatty acid source. It has been found that, irrespective of the amount of binder liquid used, at least 5–10 lbs. of conditioner per ton of solids is required and up to about 60 lbs./ton is beneficial. Quantities in excess of about 60 lbs./ton may be operative but are not economically justified.

Following addition of conditioner the slurry is adjusted to the desired pulp density, preferably 20–25% solids in any suitable agitation vessel such as a shaker or mixing tank and a light petroleum oil is added as the binder liquid or "bridging liquid". Any suitable light water immiscible oil such as kerosene or naphtha may be employed either alone or in combination with a proportion of vacuum still bottoms or heavy crude oils.

FIG. 3 shows the effect of increasing the binder liquid content, in this case kerosene, upon the agglomeration of the magnesium and calcium constituents. Clearly the higher the binder liquid content the lower the contamination in the agglomerates. However, amounts in excess of 200–220 lbs./ton of binder liquid has a deleterious effect on the form and handling of the agglomerates and should therefore be avoided.

It has been shown in FIG. 3 that better separations of ilmenite from gangue minerals can be obtained if increasing quantities of binder liquid are used. However, beyond a certain point deterioration of the spherical agglomerates occurs and retention of gangue minerals increases. Agglomeration should therefore be carried out using sufficient binder to fill only approximately 80% of the agglomerate pore volume, as shown more graphically in FIG. 5 which shows in curves 1 and 2 the effect on the gangue concentrates in the agglomerates and in addition the effect on the $TiO_2$ recovery.

Further experiments have also determined the effect of replacing some of the light oil binder liquid with amounts of collector (oleic acid) over and above the necessary for adequate conditioning. In these experiments the total volume of collector plus binder liquid was kept constant at the optimum level (80% pore volume filled). The results indicate that replacement of up to 20% of the binder liquid with oleic acid had a beneficial effect on separation efficiency, as shown more clearly in FIG. 6. It is also of interest to note that if agglomeration is carried out in the presence of the optimum quantity of binder liquid then the amount of conditioner required to give maximum recovery of ilmenite can be substantially reduced (5 lb/ton or less).

Figure 4:
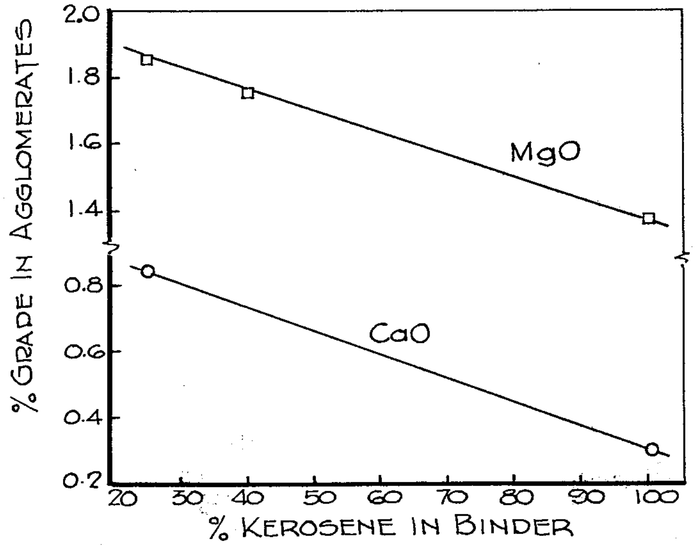
FIG. 4 is a graphic chart showing the effect of increasing the kerosene fraction in the binder.

FIG. 4 shows that increasing proportions of kerosene in a binder liquid containing vacuum still bottoms drastically reduces retention of gangue in the agglomerates. It is believed this phenomenon is not related to viscosity but to the greater gangue collecting power of the heavy oils. Heavy oil fractions should, therefore, be maintained as low as possible consistent with adequate strength of agglomerates and economic considerations.

Efficiency of separation may be improved by addition of a small amount of the order of 0.10–0.25 lb./ton of sodium silicate to the slurry. The sodium silicate acts as a depressant for the silicate minerals as shown in Table 2 below.

Although ilmenite has been reported to float with oleic acid down to pH 2, it has now been determined that surface conditioning in the region below pH 4.5 is insufficient to allow agglomeration to take place, even though the pH curves indicate that it would be beneficial. To overcome this difficulty it has been found that a two stage process in which the ore was first preconditioned with sulphuric acid at pH 3–4, the collector and bridging liquid were then added and the pH raised to 5 with sodium carbonate before agglomeration is beneficial, as is apparent from Table 2 below.

Table 2

| Example | Conditioning pH ($H_2SO_4$) | Sodium Silicate (lb/ton) | Agglomerating pH | MgO (%) | CaO (%) | $SiO_2$ (%) | Recovery (%) |
|---|---|---|---|---|---|---|---|
| 1 | 5.0 | — | 5.0 | 1.69 | 0.34 | 2.45 | 99.1 |
| 2 | 4.0 | — | 5.1 | 1.22 | 0.19 | 0.90 | 92.2 |
| 3 | 5.1 | 0.25 | 5.3 | 1.45 | 0.29 | 1.7 | 87.9 |
| 4 | 4.2 | 0.10 | 5.1 | 1.16 | 0.15 | 0.4 | 87.2 |

The oil and solids are agitated and mixed for sufficient period of time for the conditioned solids to become coated with the oil and form into spherical agglomerates which are then readily separated from the aqueous phase containing the gangue materials.

After removal of the agglomerates, separation from the aqueous phase and washing, the agglomerates are preferably roasted to convert the ilmenite to ferric oxide and titanium dioxide in the form of hard granules which are abrasion and crush resistant. The hard granules are subjected to a dry screening operation to remove surface adhesions of gangue materials.

EXAMPLE 1

A concentrate assaying:

| | | |
|---|---|---|
| $Fe_2O_3$ | — | 57.2% |
| $TiO_2$ | — | 31.6% |
| $SiO_2$ | — | 6.9% |
| MgO | — | 2.61% |
| CaO | — | 1.94% |
| $Al_2O_3$ | — | 1.61% |

Screen size 100% — 400 mesh was suspended in water at a pulp density of 30% and the pH regulated to 7 with NaOH (the natural pH of the mixture was 6). 10 lb./ton of oleic acid was added as conditioner and the mixture equilibrated for 30 minutes with vigourous shaking in a Waring Blender. 10% by weight of dry concentrate of binder (75%/25% still bottoms/kerosene) was added and shaking continued for a further 5 mins. The container was then transferred to rollers and rotated for up to 1 hr. Agglomerates of diameter ~0.5 mm. were formed which could be separated from the tailings by screening and washing.

| | %MgO | $\%SiO_2$ | $\%TiO_2$ | $\%Fe_2O_3$ |
|---|---|---|---|---|
| Tails | 7.02 | 36.7 | 10.5 | 24.9 |
| Conc. | 1.56 | 2.1 | 34.9 | 62.1 |
| | Weight split: | 14.9% Tails<br>85.1% Conc. | | |
| | Recovery of $TiO_2$: | 95.1% | | |

EXAMPLE 2

A similar material to that used in Example 1 was suspended in water at a pulp density of 30% and the pH was adjusted to pH 5 with sulphuric acid. 60 lb./ton oleic acid was added as a conditioner and the suspension was agitated vigorously for 30 minutes before 10% (by weight of dry ore) of binder (75% still bottoms —25% kerosene) was added. Agglomeration was then carried out by shaking for 5 minutes, after which the agglomerates and tailings were separated without the rolling step of Example 1. The products were assayed as follows:

| | %MgO | $\%SiO_2$ | $\%TiO_2$ | $\%Fe_2O_3$ |
|---|---|---|---|---|
| Tails | 8.54 | 47.5 | 3.1 | 13.8 |
| Conc. | 1.39 | 1.4 | 35.8 | 62.4 |
| | Weight split: | 11.5% Tails<br>88.5% Conc. | | |

-continued

| | %MgO | $\%SiO_2$ | $\%TiO_2$ | $\%Fe_2O_3$ |
|---|---|---|---|---|
| | Recovery of $TiO_2$: | 98.9% | | |

EXAMPLE 3

To illustrate the depressant effect of sodium silicate on the calcium and magnesium minerals, comparative tests were conducted using the materials and procedure of Example 1 under the following conditions and with the following results.

pH — 5.0
oleic acid — 10 lb/ton
binder — 184 lb/ton

| No Sodium Silicate | | 0.1 lb/ton Sodium Silicate | |
|---|---|---|---|
| CaO | MgO | CaO | MgO |
| 0.78% | 1.86% | 0.62% | 1.68% |
| Recovery of $TiO_2$: 99.5% | | Recovery of $TiO_2$: 98.8% | |

Addition of small amounts of sodium silicate caused a significant improvement.

EXAMPLE 4

Following production of agglomerates as in Example 1, the agglomerates were roasted to decompose the ilmenite into ferric oxide and titanium dioxide, after roasting the agglomerates were extremely strong and resistant to attrition. It was found that particles of loose gangue material were adhered to the surface of the agglomerates and this adhered material could not be readily removed by washing. A dry screening operation was carried out (100 mesh screen) with the following result.

| FRACTION | % COMPOSITION | | | % OF TOTAL | | |
|---|---|---|---|---|---|---|
| | CaO | MgO | $Al_2O_3$ | CaO | MgO | $Al_2O_3$ |
| Heads | 1.79 | 2.40 | 2.00 | 100 | 100 | 100 |
| Agglomerates | 0.33 | 1.34 | 0.95 | 14 | 43 | 37 |
| Tails | 7.54 | 6.25 | 3.60 | 63 | 39 | 52 |
| —100 m. Fraction From Sieved Agglomerates | 4.78 | 5.27 | 1.40 | 23 | 18 | 11 |

Further quantities of CaO, MgO and $Al_2O_3$, amounting to 23%, 18% and 11% of their respective total amounts of these metal oxides were removed by the screening operation.

The improved grades and recoveries achieved with the ore and concentrates of the preceding Examples were believed unattainable by either flotation or previous agglomeration procedures, and additional confirmatory tests were therefore conducted on further types of ore concentrate as set forth in the Examples below.

EXAMPLE 5

A concentrate having composition

| | | |
|---|---|---|
| $TiO_2$ | — | 36.1% |
| $Fe_2O_3$ | — | 57.4% |
| $SiO_2$ | — | 2.7% |
| MgO | — | 2.6% |
| CaO | — | 0.42% |
| $Al_2O_3$ | — | 2.00% |

was treated as in Examples 1–4.

The effect of pH was similar to that described for the concentrate of Examples 1–4, and in the following examples the concentrate was conditioned with 10 lb./ton oleic acid and agglomerated with 100 lb./ton light oil. Indications were that finer grinding is desirable for this material and that preconditioning with $H_2SO_4$ below the minimum agglomerating pH is beneficial, as discussed hereinbefore.

A further series of tests were conducted on the concentrate used in Examples 1–4, as explained by reference to Examples 6–10.

EXAMPLE 6

Concentrate agglomerated close to lowest pH possible.

a. Concentrate, screen size 46.2% — 400 mesh, was suspended in water at a pulp density of 1:3–½ and the pH regulated to 4.6 with $H_2SO_4$ (natural pH 6.2). The suspension was treated with 50 lb./ton oleic acid and 100 lb./ton stoddard solvent (sold under the Trademark varsol) and agitated vigorously for 15 min. The agglomerates formed were separated on a 65 mesh screen and washed by rolling in a countercurrent stream of fresh water.

| | %MgO | %CaO | %$Al_2O_3$ | %$SiO_2$ | %$TiO_2$ | %$Fe_2O_3$ |
|---|---|---|---|---|---|---|
| Tails | 8.7 | 14.5 | 12.2 | 46.7 | 3.7 | 15.5 |
| Conc. | 1.6 | 0.28 | 0.4 | 2.3 | 36.5 | 62.7 |
| Weight split: | | | 11.9% tails | | | |
| | | | 88.1% conc. | | | |
| Recovery $TiO_2$: | | | 98.6% | | | |

b. Concentrate, screen size 60% — 400 mesh was conditioned with $H_2SO_4$ at pH 4.5 at a pulp density of 1:3–½. 10 lb./ton of the oleic acid and 100 lb./ton stoddard solvent were added and the suspension vigorously shaken for up to 15 min. Agglomerates were separated on a 65 m. screen and washed as before.

| | %MgO | %CaO | %$Al_2O_3$ | %$SiO_2$ | %$TiO_2$ | %$Fe_2O_3$ |
|---|---|---|---|---|---|---|
| Tails | 6.28 | 8.31 | 6.42 | 26.0 | 17.5 | 36.0 |
| Conc. | 1.71 | 0.49 | 0.77 | 1.1 | 36.2 | 84.2 |
| Weight split: | | | 16.2% tails | | | |
| | | | 83.8% conc. | | | |
| Recovery of $TiO_2$: | | | 86.7% | | | |

EXAMPLE 7

Concentrate preconditioned with $H_2SO_4$ below minimum agglomerating pH.

a. Concentrate, screen size 46.2% — 400 mesh and pulp density 1:3–½, was conditioned with $H_2SO_4$ at pH 2.7 for 15 minutes. 50 lb./ton of oleic acid and 100 lb./ton stoddard solvent were added and shaking continued for 5 mins. The pH was then raised to 4.3 with $Na_2CO_3$ and agitation continued for a few more minutes. Agglomerates were separated and washed as before.

| | %MgO | %CaO | %$Al_2O_3$ | %$SiO_2$ | %$TiO_2$ | %$Fe_2O_3$ |
|---|---|---|---|---|---|---|
| Tails | 7.08 | 7.98 | 7.80 | 33.4 | 11.1 | 28.3 |
| Conc. | 1.26 | 0.21 | 0.38 | 1.0 | 37.1 | 63.2 |
| Weight split: | | | 19.3% tails | | | |
| | | | 80.7% conc. | | | |
| Recovery of $TiO_2$: | | | 93.3% | | | |

b. Ground concentrate, screen size 38.3% — 400 mesh was treated as in 2*a* but at pH 4.0. 60 lb/ton of oleic acid and 150 lb/ton stoddard solvent were used to form the agglomerates after raising the pH to 4.9 with $Na_2CO_3$. Product was collected and washed as in *a*.

| | %MgO | %CaO | %$Al_2O_3$ | %$SiO_2$ | %$TiO_2$ | %$FeO_3$ |
|---|---|---|---|---|---|---|
| Tails | 7.26 | 7.98 | 8.20 | 33.4 | 11.4 | 28.3 |
| Conc. | 1.26 | 0.19 | 0.25 | 0.9 | 36.0 | 61.6 |
| Weight split: | | | 18.6% tails | | | |
| | | | 81.4% conc. | | | |
| Recovery of $TiO_2$: | | | 92.2% | | | |

EXAMPLE 8

Agglomeration using diluted still bottoms as bridging liquid

Concentrate, screen size 96.8% — 400 mesh, was conditioned with $H_2SO_4$ to pH 4.7 at pulp density 1:3-½ and agglomerated with 10 lb/ton oleic acid and 200 lb/ton bridging liquid consisting of vacuum still bottoms diluted with 25% kerosene. Agglomerates separated and washed as before.

| | %MgO | %CaO | %$Al_2O_3$ | %$SiO_2$ | %$TiO_2$ | %$Fe_2O_3$ |
|---|---|---|---|---|---|---|
| Tails | 6.40 | 7.5 | NA | 27.8 | 17.8 | 35.1 |
| Conc. | 1.74 | 0.66 | NA | 2.8 | 35.0 | 61.1 |
| Weight split: | | | 20.7% tails | | | |
| | | | 79.3% conc. | | | |
| Recovery of $TiO_2$: | | | 88.4% | | | |

EXAMPLE 9

Effect of Sodium Silicate on efficiency of separation.

a. Concentrate, screen size 38.3% — 400 mesh, at a pulp density of 1:3–½ was conditioned with 0.1 lb/ton 'N' grade sodium silicate and then the pH lowered to 4.2 with sulphuric acid. 60 lb/ton oleic acid and 150 lb/ton stoddard solvent were added and the slurry agitated for 5 min. The pH was then raised to 4.5 with $Na_2CO_3$ and the system shaken for 15 minutes. Agglomerates were separated and washed as before.

| | %MgO | %CaO | %$Al_2O_3$ | %$SiO_2$ | %$TiO_2$ | %$Fe_2O_3$ |
|---|---|---|---|---|---|---|
| Tails | 5.90 | 5.99 | 6.4 | 26.2 | 16.3 | 38.8 |
| Conc. | 1.16 | 0.15 | 0.5 | 0.4 | 37.5 | 63.3 |
| Weight split: | | | 25.3% tails | | | |
| | | | 74.7% conc. | | | |
| Recovery of $TiO_2$: | | | 87.2% | | | |

b. Treatment as in 9*a* except that 0.5 lb/ton sodium silicate used.

| | %MgO | %CaO | %$Al_2O_3$ | %$SiO_2$ | %$TiO_2$ | %$Fe_2O_3$ |
|---|---|---|---|---|---|---|
| Tails | 4.79 | 4.60 | 4.8 | 20.4 | 20.7 | 44.5 |
| Conc. | 1.21 | 0.18 | 0.3 | 0.5 | 38.1 | 64.1 |
| Weight split: | | | 33.4% Tails | | | |
| | | | 66.6% conc. | | | |
| Recovery of $TiO_2$: | | | 78.6% | | | |

Comparison of 9*a* and *b* with 6*a* shows that the use of sodium silicate as a depressant allows elimination of further quantities of magnesium, calcium and silica.

EXAMPLE 10

Two stage agglomeration to improve the removal of aluminum.

Concentrate, screen size 60% − 400 mesh, at a pulp density of 1:3–½, was regulated to pH 5.8 with $Na_2CO_3$. 10 lb/ton oleic acid and 100 lb/ton stoddard solvent were added and the slurry agglomerated. The tails were separated ($T_1$) and the agglomerates resuspended in water at pH 4.3 (regulated with $H_2SO_4$). Agitation was continued and tails separated ($T_2$).

| | %MgO | %CaO | %$Al_2O_3$ | %$SiO_2$ | %$TiO_2$ | %$Fe_2O_3$ |
|---|---|---|---|---|---|---|
| Tails 1 | 6.03 | 9.65 | 10.50 | 32.2 | 13.6 | 29.7 |
| Tails 2 | 8.11 | 8.87 | 5.70 | | | |
| Conc. | 1.61 | 0.86 | 0.57 | 2.2 | 36.1 | 61.9 |
| Weight split: | | | | 8.2% tails 1 | | |
| | | | | 5.4% tails 2 | | |
| | | | | 86.4% conc. | | |
| Recovery of $TiO_2$: | | | | 92.5% | | |

Comparison with example 6b shows alumina content in Example 10 marginally improved. Note that $Al_2O_3$ content in $T_1$ is much higher than in $T_2$.

The embodiments of the invention in which an exclusive property or privilege is claimed are defined as follows:

1. An agglomeration process for selective recovery of ilmenite from an aqueous suspension containing particulate ilmenite and siliceous gangue materials comprising a. adding an acid to said suspension to lower the pH to about 4–5.5, b. mixing in said suspension at least 10 lb/ton of said particulate materials of a hydrophobic organic collector containing polar groups which are selectively adsorbed by ilmenite, thereby rendering said particulate ilmenite hydrophobic, c. adding a water-immiscible binder liquid to the mixture in an amount of about 100-200 lb/ton of said particulate materials, d. agitating said mixture to cause said hydrophobic ilmenite solids to adsorb said binder liquid and thereafter form spherical ilmenite agglomerates, and e. separating said ilmenite agglomerates from a residual aqueous suspension containing said siliceous materials.

2. A process according to claim 1 wherein said aqueous suspension containing particulate ilmenite and siliceous gangue materials has a pulp density of about 20 to about 40% solids.

3. A process according to claim 2 wherein said pulp density has about 20–25% solids.

4. A process according to claim 3 wherein the pH is lowered in step *a* to about 4.5–5.0.

5. A process according to claim 1 wherein the collector of step *b* is present in an amount between 10 lb and 40 lb/ton of said particulate materials and is selected from the group consisting of liquid fatty acids and a petroleum sulphonate promoter.

6. A process according to claim 1 wherein said collector of step *b* is oleic acid in an amount between 10 lb and 40 lb/ton of said particulate materials.

7. A process according to claim 1 wherein the binder of step *c* is added in an amount of 130–180 lb/ton of said particulate materials and is comprised of a member selected from the group consisting of naphtha and kerosene and mixtures thereof with vacuum still bottoms an crude oils.

8. A process according to claim 7 wherein the binder of step *c* includes 5–20% by weight of the collector of step *b*, based on total weight of collector and binder liquid.

9. A process according to claim 1 wherein between about 0.1 and about 0.5 lb/ton of said particulate materials of sodium silicate is added to said aqueous suspension containing particulate ilmenite and siliceous gangue materials prior to step *a*.

10. An agglomeration process for selective recovery of ilmenite from an aqueous suspension containing particulate ilmenite and siliceous gangue materials comprising a. adding an acid to said suspension to lower the pH to between about 5–6, b. mixing in said suspension between about 10 lb and 40 lb/ton of said particulate materials of a hydrophobic organic liquid collector containing polar groups which are selectively adsorbed by ilmenite, thereby rendering said particulate ilmenite hydrophobic, c. mixing said suspension with a binder oil in an amount of 100–200 lb/ton of said particulate materials, d. agitating said mixture to cause said hydrophobic ilmenite solids to adsorb said oil and thereafter form spherical agglomerates containing ilmenite, e. separating said formed agglomerates from an aqueous tails suspension containing siliceous gangue materials, f. mixing and agitating said separated agglomerates with an aqueous wash medium at a pH between about 4 and about 5, and g. separating the agglomerates from a residual aqueous suspension.

11. An agglomeration process for selective recovery of ilmenite from an aqueous suspension containing particulate ilmenite and siliceous gangue materials comprising a. adding an acid to said suspension to lower the pH to about 3–4, b. mixing in said suspension (i) between about 10 lb and about 40 lb/ton of said particulates of a hydrophobic organic liquid collector containing a polar group which is selectively adsorbed by ilmenite, thereby rendering said particulate ilmenite hydrophobic and (ii) a binder oil in an amount between 100–200 lb/ton of said particulate materials, c. adding a basic compound to raise the pH in the mixture to about 5, d. agitating said mixture to cause hydrophobic ilmenite solids in said mixture to adsorb said oil and thereafter form spherical ilmenite-containing agglomerates, and e. separating said mixture into said agglomerates and a residual aqueous suspension containing said siliceous materials.

12. A process according to claim 11 wherein the acid added at step *a* is sulphuric acid.

13. A process according to claim 11 wherein said basic compound added at step *c* is sodium carbonate.

* * * * *